US006162544A

United States Patent [19]

Hanzawa

[11] Patent Number: 6,162,544

[45] Date of Patent: Dec. 19, 2000

[54] KILN TOOL WITH GOOD WORKABILITY

[75] Inventor: Shigeru Hanzawa, Kaganihara, Japan

[73] Assignee: NGK Insulators, Ltd., Japan

[21] Appl. No.: 09/362,526

[22] Filed: Jul. 28, 1999

[30] Foreign Application Priority Data

Aug. 5, 1998 [JP] Japan .................................. 10-222139

[51] Int. Cl.$^7$ ........................................................ B32B 9/00

[52] U.S. Cl. ................... 428/408; 428/293.4; 428/293.7; 428/294.4; 432/253; 432/256; 432/258

[58] Field of Search .............................. 428/293.4, 293.7, 428/294.4, 408; 432/253, 256, 258

[56] References Cited

U.S. PATENT DOCUMENTS

| | | | |
|---|---|---|---|
| 4,324,843 | 4/1982 | Brennen et al. | 428/697 |
| 4,341,826 | 7/1982 | Prewo et al. | 428/35 |
| 4,738,902 | 4/1988 | Prewo et al. | 428/697 |
| 5,166,004 | 11/1992 | Bose et al. | 428/549 |
| 5,294,460 | 3/1994 | Tani et al. . | |
| 5,455,212 | 10/1995 | Das Chaklader et al. | 501/89 |
| 5,840,436 | 11/1998 | Hanzawa | 428/698 |

FOREIGN PATENT DOCUMENTS

| | | |
|---|---|---|
| 0 528 411 A1 | 2/1993 | European Pat. Off. . |
| 0 864 548 A2 | 9/1998 | European Pat. Off. . |
| 0 926 111 A2 | 6/1999 | European Pat. Off. . |
| 1 457 757 | 12/1976 | United Kingdom . |

OTHER PUBLICATIONS

Patent Abstracts of Japan, vol. 0176, No. 6, Nov. 8, 1993 & JP 05 186276 A, Jul. 27, 1993.

Patent Abstracts of Japan, JP 10251065 A, Sep. 22, 1998.

*Primary Examiner*—Deborah Jones
*Assistant Examiner*—Jason Resnick
*Attorney, Agent, or Firm*—Wall Marjama Bilinski & Burr

[57] ABSTRACT

A kiln tool uses a fiber-composite material comprising a yarn aggregate in which yarn including at least a bundle of carbon fibers and a carbon component other than carbon fibers is three-dimensionally combined and integrally formed so as not to separate from each other; and a matrix made of Si—SiC-based fiber filled between the yarn adjacent to each other within the yarn aggregate. The kiln tool has good workability and working accuracy, and excellent durability.

2 Claims, 7 Drawing Sheets

KILN TOOL WITH GOOD WORKABILITY

BACKGROUND OF THE INVENTION AND RELATED ART STATEMENT

The present invention relates to a kiln tool with a complicated shape, for example, that with a plurality of fine grooves, and more particularly to a kiln tool with good workability that can be suitably employed for brazing of automobile parts, electronic parts, etc.

Conventionally, suitable ceramics have been optionally selected according to sintering temperature, atmosphere, etc., as materials for a kiln tool employed for brazing of automobile parts, electronic parts, etc. Unlike ordinary setters, however, a plurality of grooves are provided to be filled with brazing filler metal to enable brazing at predetermined positions of an object in a kiln. Grinding processing is thus generally performed to form a plurality of grooves on the kiln tool with a predetermined accuracy.

However, materials of the kiln tool are ceramics for which problems tend to occur due to unworkability and brittleness resulting from their high degree of hardness, and when a plurality of grooves are formed into the kiln tool at predetermined accuracy, a processing cost increases to make the use of ceramic materials unrealistic.

Carbon kiln tools that have been employed conventionally have problems such as poor durability, although even a plurality of grooves mentioned above can be easily formed therein.

SUMMARY OF THE INVENTION

The present invention has been made to solve the above-mentioned problems, and an object of the present invention is to provide a kiln tool with good workability and working accuracy as well as high durability in high temperature, strong oxidation and corrosion environments.

The present invention provides a kiln tool with good workability comprising: a fiber-composite material comprising a yarn aggregate in which yarn including at least a bundle of carbon fibers and a carbon component other than carbon fibers is three-dimensionally combined and integrally formed so as not to separate from each other, and a matrix made of a Si—SiC-based material filled between the yarn adjacent to each other within the yarn aggregate.

In the present invention, preferably, forming accuracy (Ra) of a fiber-composite material employed for a kiln tools is not higher than 3 μm, more preferably not higher than 2 μm.

BRIEF DESCRIPTION OF THE DRAWINGS

In the accompanying drawings:

FIGS. 2A and 2B are cross-sectional views schematically showing the microstructure of the main part of a fiber-composite material according to the present invention, in which FIG. 2A is a cross-sectional view taken along the line IIa—IIa of FIG. 1, and FIG. 2B is a cross-sectional view taken along the line IIb—IIb of FIG. 1.

DETAILED DESCRIPTION OF PREFERRED EMBODIMENT

A kiln tool according to the present invention employs a fiber-composite material comprising: a yarn aggregate in which yarn including at least a bundle of carbon fibers and a carbon component other than carbon fibers is three-dimensionally combined and integrally formed so as not to separate from each other; and a matrix made of Si—SiC-based material filled between the yarn adjacent to each other within the yarn aggregate.

The use of a fiber-composite material of such a composition allows the kiln tool to have good workability and working accuracy together with high durability in hot and strong oxidation and corrosion environments. As a result, the kiln tool of the present invention can be formed in a complicated shape, such as that with a plurality of fine grooves suitable for jig elements for brazing.

Working accuracy (Ra) of a fiber-composite material employed for a kiln tool of the present invention is preferably not higher than 3 μm. This is because the shape of the kiln tool can definitely correspond to an object of brazing.

Figure 7:
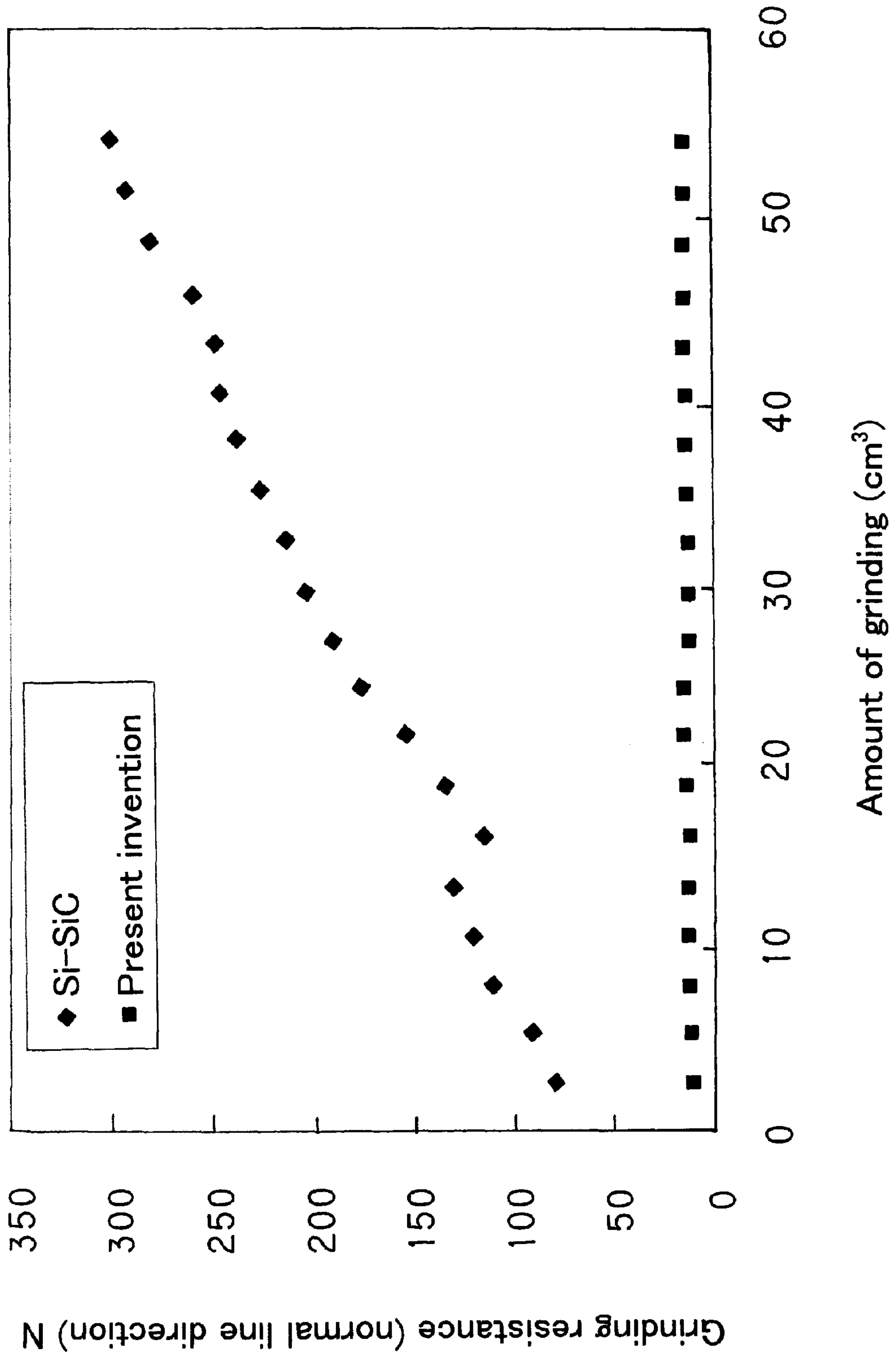
FIG. 7 is a graph showing the changes in grinding resistance against amounts of grinding for the materials constituting the kiln tool of the present invention and another material.

For the fiber-composite material employed for the kiln tool of the present invention, as shown in FIG. 7, it is preferable that grinding resistance against an amount of grinding is 1/5–1/40 that of an Si—SiC material. This enables relatively easy production of a kiln tool with a complicated shape, resulting in a great reduction in processing cost.

Hereinbelow, the novel fiber-composite material according to the present invention will be described.

The material is a material of new idea, which is made by giving improvement to the basic composition based on a so-called C/C composite.

The C/C composite produced by the following process is known. Several hundred to several ten thousand pieces, ordinarily, of carbon fibers having a diameter of about 10 μm are bundled to obtain fiber bundles (yarn), and the fiber bundles are arranged two-dimensionally to form a one-direction sheet (UD sheet) or various kinds of cloth. These sheets or cloths are laminated to form a preformed product with a predetermined shape (fiber preform). A matrix made of carbon is formed within the preformed product by CVI method (Chemical Vapor Infiltration) or by inorganic-polymer-impregnation sintering method to obtain a C/C composite.

The fiber-composite material uses a C/C composite as a body material and has an excellent characteristic of maintaining the structure of carbon fibers without damaging the structure. Moreover, the fiber-composite material according to the present invention has the microstructure filled with the matrix made of an Si—SiC-based material among the yarn that is adjacent to each other in the yarn aggregate.

In the present invention, Si—SiC-based material is a general term for the material that contains Si and silicon carbide as the main component. In the present invention, when Si is impregnated into the C/C composite or into the molded product made of the C/C composite, Si reacts mainly with the component of carbon or remained carbon in the composite, and is partially carbonized to grow Si a part of which is carbonized among the yarn aggregates. The matrix may contain some intermediate phases from the silicon phase in which silicon has almost purely remained to the almost-pure silicon carbide phase. That is, the matrix is typically composed of the silicon phase and the silicon carbide phase, but the matrix may contain the Si—SiC coexisting phase in which the carbon content changes with gradient based on silicon between the silicon phase and the silicon carbide phase. Si—SiC-based material is a general term for the material in which the carbon concentration changes from 0 mole % to 50 mole % in such Si—SiC system.

In the fiber-composite material, preferably, the matrix comprises the silicon carbide phase that has grown along the surface of the yarn. In this case, the strength of each yarn itself is further improved, and the fiber-composite material is hardly damaged.

In the fiber-composite material, preferably, the matrix comprises the silicon phase that is made of silicon, and the silicon carbide phase has grown between this silicon phase and the yarn. In this case, the surface of the yarn is strengthened by the silicon carbide phase. At the same time, the micro-dispersion of stress is further promoted because the central part of the matrix is composed of the silicon phase that has a relatively low hardness.

In the fiber-composite material, preferably, the matrix has an inclined composition in which the content rate of silicon becomes higher according to the distance from the surface of the yarn.

In the fiber-composite material, preferably, the yarn aggregate comprises more than one yarn array element, each of the yarn array elements being formed by arranging more than one yarn two-dimensionally in a nearly parallel direction, and each of the yarn array elements being laminated. The fiber-composite material, therewith, has a laminated structure in which the yarn array elements that have a plurality of layers are laminated toward one direction.

In this case, more preferably, the direction of the length of each yarn, in the yarn array elements adjacent to each other, intersects each other. The dispersion of stress is further promoted therewith. More preferably, the direction of the length of each yarn, in the yarn array elements adjacent to each other, intersects each other at right angles.

Preferably, the matrices form a three-dimensional network structure by being connected with each other in the fiber-composite material. In this case, more preferably, the matrices are arranged, in each of the yarn array elements, two-dimensionally in a nearly parallel direction, the matrices have grown, in each of the yarn array elements adjacent to each other, being connected with each other, and the matrices form a three-dimensional lattice structure therewith.

The gap among the yarn adjacent to each other, may be filled with the matrix to the level of 100%, but the gap among the yarn may be partially filled with the matrix.

The component of carbon other than carbon fibers in the yarn is, preferably, carbon powder, and, more preferably, the carbon powder that is made to be graphite.

Figure 1:
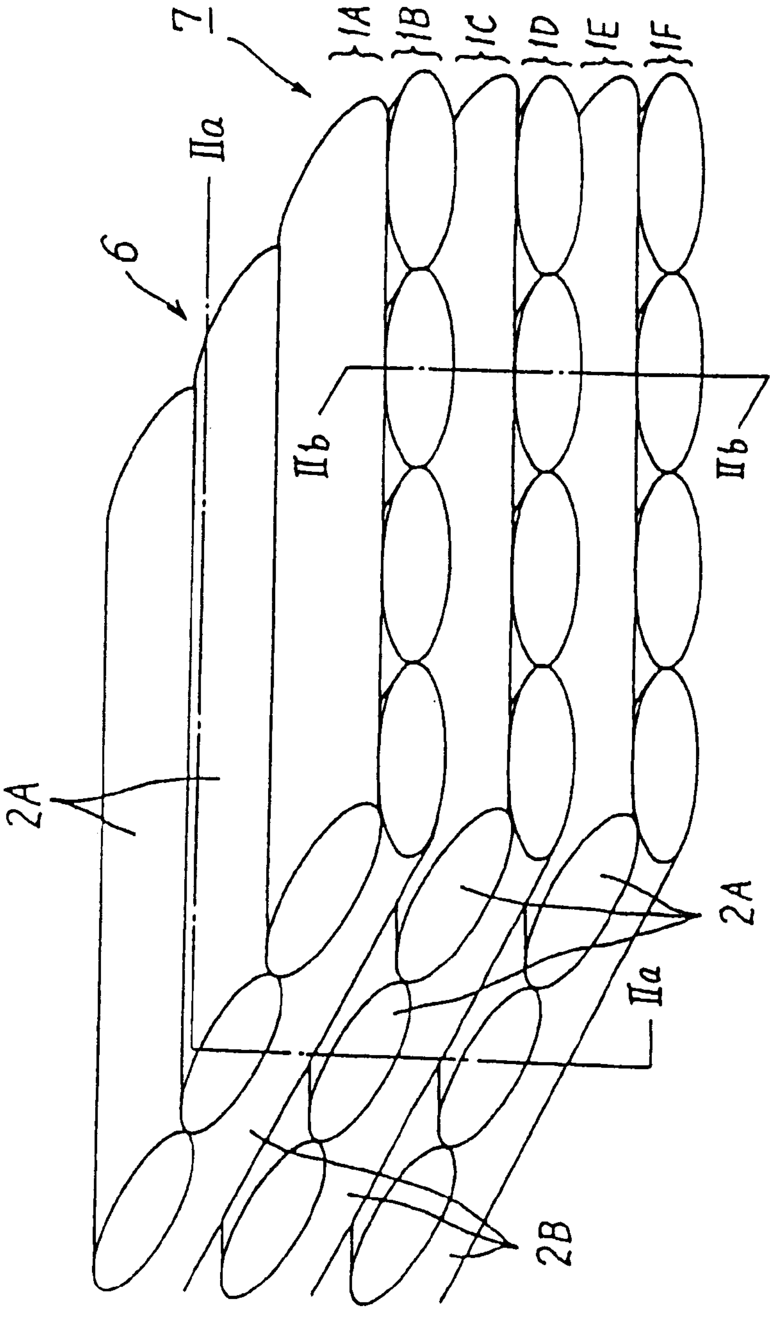
FIG. 1 is a perspective view schematically showing the configuration of yarn aggregate of a fiber-composite material according to the present invention.
Figure 2A:
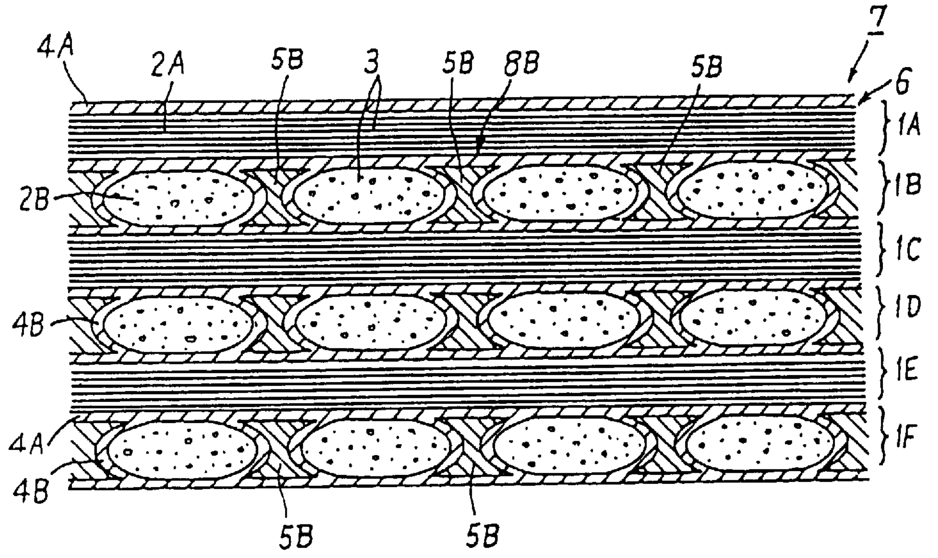
Figure 2B:
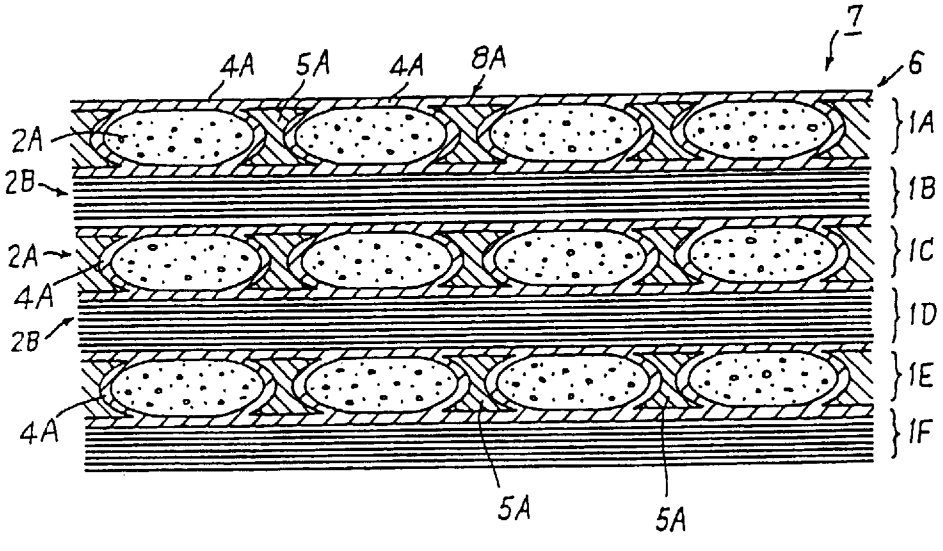
Figure 3:
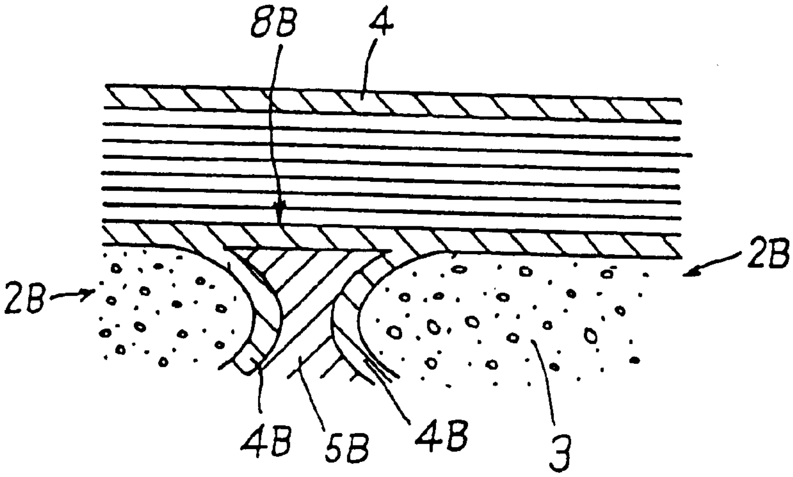
FIG. 3 is an enlarged view of a part of FIG. 2A.

FIG. 1 is a perspective view schematically showing the idea of yarn aggregate. FIG. 2A is a cross-sectional view taken along the line IIa—IIa of FIG. 1, and FIG. 2B is a cross-sectional view taken on line IIb—IIb of FIG. 1. FIG. 3 is an enlarged view of a part of taken from FIG. 2A.

The skeleton of a fiber-composite material 7 comprises the yarn aggregate 6. The yarn aggregate 6 is constructed by laminating the yarn array elements 1A, 1B, 1C, 1D, 1E, 1F upward and downward. In each of the yarn array elements, each yarn 3 is arranged two-dimensionally, and the direction of the length of each yarn is nearly parallel to each other. The direction of the length of each yarn, in each of the yarn array elements adjacent to each other upward and downward, intersects at right angles. That is, the direction of the length of each of the yarn 2A in each yarn array elements 1A, 1C, 1E is parallel to each other, and the direction of the length thereof intersects the direction of the length, at right angles, of each yarn 2B in each of the yarn array elements 1B, 1D, 1F.

Each yarn comprises fiber bundle 3 comprising carbon fibers and a component of carbon except carbon fibers. The yarn array elements are laminated to form the yarn aggregate 6 that is three-dimensional and lattice shaped. Each yarn has become substantially elliptical because of being crushed during the pressure molding process to be described below.

In each of the yarn array elements 1A, 1C, 1E, the gap among yarns, adjacent to each other is filled with the matrices 8A, each of the matrices 8A runs along the surface of the yarn 2A in parallel with the yarn. In each of the yarn array elements 1B, 1D, 1F, the gap among yarns, adjacent to each other is filled with the matrices 8B, each of the matrices 8B runs along the surface of the yarn 2B in parallel with the yarn.

In this example, the matrices 8A and 8B comprise the silicon carbide phases 4A, 4B that coat the surface of the yarn and the Si—SiC-based material phases 5A, 5B in which the rate of contained carbon is less than in the silicon carbide phases 4A, 4B. The silicon carbide phases may partially contain silicon. In this example, the silicon carbide phases 4A, 4B have grown also between yarns, 2A, 2B adjacent to each other up and down.

Each of the matrices 8A, 8B runs along the surface of yarn in the long and narrow shape, preferably, linearly, and each of the matrices 8A and 8B intersects at right angles each other. The matrices 8A in the yarn array elements 1A, 1C, 1E and the matrices 8B in the yarn array elements 1B, 1D, 1F, which intersect the matrices 8A at right angles, are respectively connected in the gap part between yarns, 2A and 2B. As a result, the matrices 8A, 8B form a three-dimensional lattice as a whole.

Figure 4:
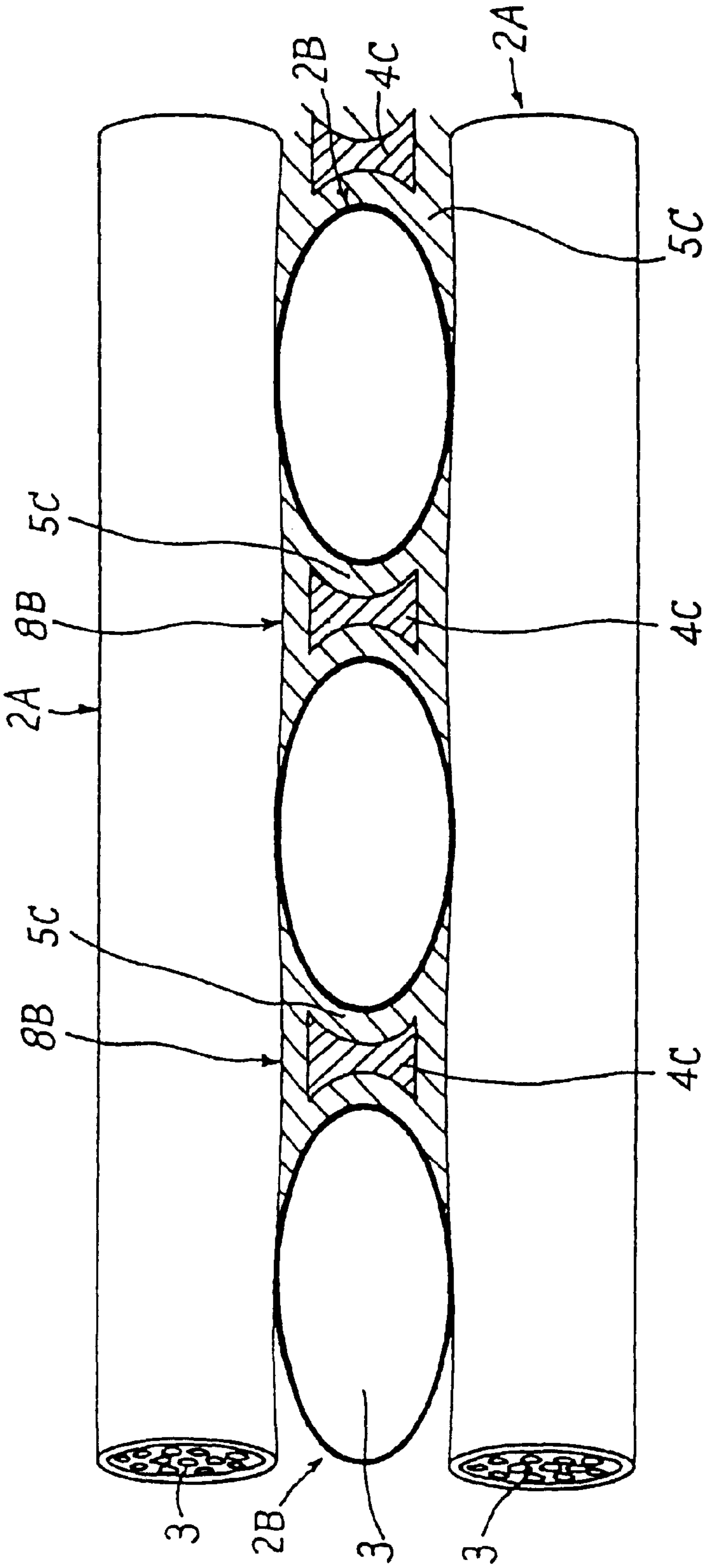
FIG. 4 is a partially sectional perspective view schematically showing the microstructure of the main part of a fiber-composite material according to another embodiment of the present invention.

FIG. 4 is a partially sectional perspective view of the main part of a fiber-composite material constituting a kiln tool of another embodiment of the present invention. In this example, a silicon carbide phase does not substantially exist between yarns, 2A and 2B adjacent to each other up and down. In each of the yarn array elements, the matrix 8A or 8B is formed individually between yarns, 2A and 2A adjacent to each other, or between yarns 2B and 2B adjacent to each other. The shapes of the matrices 8A and 8B are the same as the examples of FIG. 1 to FIG. 3 except that a silicon carbide phase does not exist between yarns, adjacent to each other up and down. Each of the matrices 8A and 8B individually comprises the silicon carbide phase 5C, that has grown in contact with the surfaces of yarns, 2A, 2B, and the Si—SiC-based material phase that has grown in the silicon carbide phase 5C separated from the yarn.

Each of the Si—SiC-based material phase, preferably, has an inclined composition in which the silicon concentration becomes lower according to the distance from the surface of the yarn, or preferably, comprises a silicon phase.

Figure 5A:
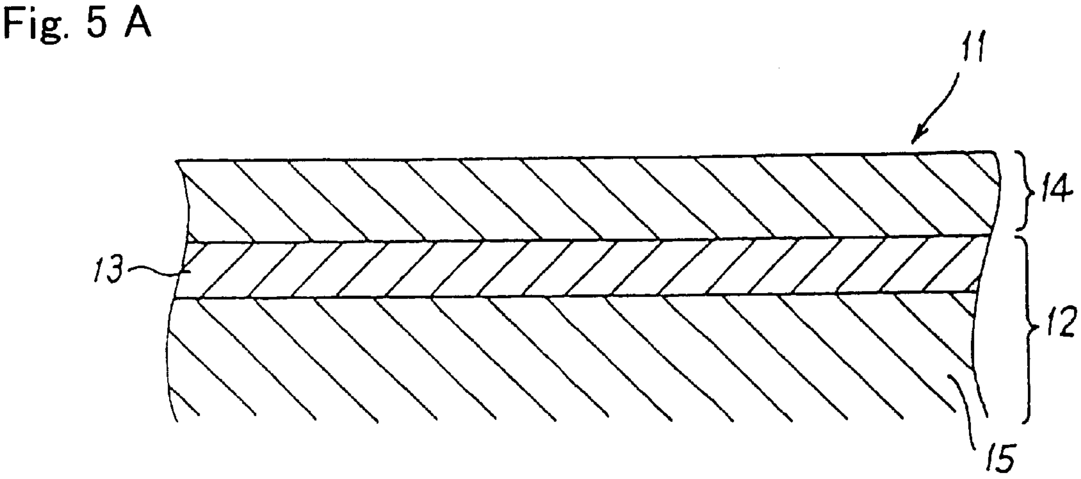
FIG. 5A is a sectional view of a kiln tool 11.
Figure 5B:
FIG. 5B is a sectional view of a kiln tool 16.

As shown in FIG. 5A, the fiber-composite material 11 according to the present invention, preferably, comprises the C/C composite 15 and the fiber-composite material layer 13 that has grown by that the surface of the C/C composite 15 is impregnated with Si, and the silicon layer 14 may have grown on the fiber-composite material layer 13. Reference numeral 12 shows the area of the body of C/C composite that has never been impregnated with Si. As shown in FIG. 5(*b*), the whole of the element 16 is preferably formed with the fiber-composite material according to the present invention.

In the case that the fiber-composite material layer 13 is provided, the thickness thereof is preferably 0.01 to 100 mm. Further, the Si concentration in the fiber-composite material layer preferably becomes lower from the surface toward the inside.

If the fiber-composite material according to the present invention contains 10 to 70% by weight of carbon fibers, the material may contain, for example, compounds or elements other than carbon such as boron nitride, boron, copper, bismuth, titanium, chromium, tungsten and molybdenum.

The thickness of the fiber-composite material layer 13, that is provided by the fact that Si—SiC is impregnated into the body material, is preferably 0.01 to 100 mm, more preferably 0.05 to 50 mm, and most preferably 0.1 to 10 mm.

The Si concentration in the fiber-composite material layer 13 is preferably provided in such a way that the concentration inclines in a range of from 90/100 to 0/100 from the surface of the layer toward the inside.

The fiber-composite material according to the present invention, as described above, may contain at least one substance selected from the group consisting of boron nitride, boron, copper, bismuth, titanium, chromium, tungsten and molybdenum. Because these substances have a lubricant property, by impregnating these substances into the body material made of C/C composite, even in the part of the body material impregnated with an Si—SiC-based material, the lubricant property of fibers can be maintained and a decline in physical properties can be prevented.

For example, the boron nitride content is preferably 0.1 to 40% by weight to 100% by weight of the body material made of C/C composite. The effect of increased lubricant property with boron nitride cannot be adequately obtained if the concentration is less than 0.1% by weight, and, in the case in which the concentration is more than 40% by weight, the brittleness of boron nitride appears in the composite material.

The fiber-composite material according to the present invention can be produced preferably by the following process.

Carbon fiber bundles are made by making the bundles contain powdery binder-pitch and cokes that eventually become a matrix, and, further, if necessary, by making the bundles contain phenol resin powder. A soft coat made from plastic such as thermoplastic resin is made around the carbon fiber bundle to obtain a soft intermediate material. The soft intermediate material is made to have a yarn-shape (Japanese Patent Application No. 63-231791), and is molded with a hot press at 300 to 2000° C. at atmospheric pressure to 500 kg/cm$^2$ to obtain a molded product after the necessary amount of the material is laminated. According to the demand, the molded product is carbonized at 700 to 1200° C., and is made to be graphite at 1500 to 3000° C. to obtain a burned product.

The carbon fibers may be any one of the pitch-based carbon fibers that are obtained by providing pitch for spinning use, melt-spinning the pitch, making the pitch infusible and carbonizing the pitch, and PNA based carbon fibers that are obtained by giving flame resistance to acrylonitrile polymer (or copolymer) fiber and by carbonizing the fiber.

As a carbon precursor that is necessary for making a matrix, thermosetting resins such as phenol resins and epoxy resins, tar and pitch may be used, and these may contain cokes, metal, metal compounds, inorganic and organic compounds.

After that, this molded product or this burned product, produced as in the above method, and Si are held in a temperature range of 1100 to 1400 C. under a pressure of 0.1 to 10 hPa in a furnace for one or more than one hour. Preferably, in the process, inert gas is allowed to flow to form an Si—SiC layer on the surface of the molded product or the burned product, in such a way that 0.1 or more than 0.1 (NL)(normal litter: corresponding to 5065 litter at 1200° C., under a pressure of 0.1 hPa) of the gas is allowed to flow per 1 kg of the total weight of the molded product, or the burned product, and Si. Thereafter, the temperature is raised to 1450 to 2500° C., preferably, to 1700 to 1800° C. to melt an Si—SiC-based material, to impregnate the material into the inside of the pores of the above-described molded product or the burned product, and to form the material. In the process, in the case in which the molded product is used, the molded product is burned to obtain the fiber-composite material.

The molded product, or the burned product, and Si are held at a temperature of 1100 to 1400° C., under a pressure of 1 to 10 hPa for one hour or more. In the process, the amount of inert gas to be used is controlled in such a way that per 1 kg of the total weight of the molded product, or the burned product, and Si, 0.1 or more than 0.1 NL, preferably, 1 or more than 1 NL, more preferably, more than 10 NL of inert gas is made to flow.

Thus, in the burning process (namely, in the process in which Si is not yet melted or impregnated), because providing an atmosphere of inert gas removes the generated gas such as CO brought by the change in which inorganic polymer or inorganic substance become ceramics from the atmosphere of burning and prevents the contamination of the burning atmosphere caused by the outside factor such as $O_2$ or the like in the air, it is possible to keep low porosity of the fiber-composite material that is obtained by melting and impregnating Si in the subsequent process.

In the process in which Si is melted and impregnated into the molded product or the burned product, the surrounding temperature is raised to 1450 to 2500° C., more preferably to 1700 to 1800° C. Then, the pressure in the burning furnace is maintained preferably in a rage of 0.1 to 10 hPa. The atmosphere in the furnace is preferably an inert gas or argon gas atmosphere.

As described above, because the combination of the usage of the soft intermediate material, the impregnation of silicon and the fusion of silicon brings about the retention of long and narrow pores between the yarn in the burned product or the molded product, silicon easily migrates into the inner part of the molded product or the burned product along the long and narrow pores. In the migration process, silicon reacts with carbon in the yarn and is gradually carbonized from the surface side of the yarn to produce the fiber-composite material according to the present invention.

The depth of the fiber-composite material layer is controlled with the porosity and the diameter of the pores. For example, in the case where the thickness of an Si—SiC-based material layer is 0.01 to 10 mm, the porosity in the part close to the molded product or the burned product is designed to be at least 5 to 50% and the average diameter of the pores is designed to be one or more μm. The porosity in the molded product or the burned product is preferably 10 to 50% and the average diameter of the pores is preferably 10 or more μm. If the porosity is less than 5%, the binder in the molded product or the burned product cannot be removed, and if the porosity is larger than 50%, the Si—SiC-based material is impregnated too deeply inside the body material to lose shock resistance of the fiber-composite material.

In order to form the fiber-composite material layer on the surface of C/C composite, a molded product designed to have a porosity of 0.1 to 30% at least in the part near to the surface during burning is preferably used.

In order to make the porosity in the molded product or the burned product become lower from the surface toward the inside, more than one preformed sheets, made of preformed yarn of different binder-pitch, are arranged and molded in such a way that from the inside to the surface layer side the binder-pitch becomes larger.

In order to make the silicon concentration in the fiber-composite material layer have an incline, the burned product adjusted to have the porosity in the part near to the surfaces which becomes lower from the surface to the inside, or the molded product adjusted to have the porosity at least in the part near to the surface which becomes lower, during burning, from the surface to the inside are used to produce the fiber-composite material.

EXAMPLES

Hereinafter, the present invention is illustrated in more detail by examples, however, the present invention is not limited to the examples.

The properties of the composite materials obtained by each example were measured by the methods as described below.

Method of measuring porosity:

$$\text{porosity } (\%) = [(W3-W1)/(W3-W2)] \times 100$$

(by Archimed s method)

Dry weight (W1): measured after drying the sample at 100 C. for 1 hour in an oven.

Under water weight (W2): measured in water after boiling the sample in water and making water migrate into the pores completely.

Drinking weight (W3): measured at atmospheric pressure after making water migrate into the sample completely.

Method of evaluating compressive strength;

Compressive strength was calculated using the compression-loaded test piece with the following formula.

$$\text{Compressive strength} = P/A$$

(in the formula, P is the load when loaded with the maximum load, A is the minimum sectional area of the test piece.)

Method of evaluating dynamic coefficient of friction;

The frictional force Fs(N) was measured on the test piece of 60 mm×60 mm×5 mm (thickness) mounted on a rotary jig and pressed against the partner material (SUJ, 10 mm ball) with a constant load Fp(N).

The dynamic coefficient of friction was calculated with the following formula.

$$\text{Coefficient of friction } \mu = Fs/Fp$$

Method of evaluating working accuracy;

The Ra was evaluated according to JIS B 0601-1994.

Method of workability;

The workability was evaluated based on an amount of a GC grind stone ground when the test piece of 60 mm×60 mm×5 mm (thickness) was ground using the GC grind stone with a load of 1 g.

Durability test under atmospheric gas 1:

Each test piece thus obtained was heated from room temperature to 1150° C. over 15 minutes, maintained at 1150° C. for 20 minutes, and then cooled to room temperature over 15 minutes in DX gas (dew point: +10° C.). This process is considered as one cycle. The changes in weight of the test piece after 100 cycles were measured to evaluate durability.

The major components of DX gas were $N_2$ (71%), CO (11%), $H_2$ (13%), and $CO_2$ (5%).

Durability test in atmospheric gas 2:

Each test piece thus obtained was heated from room temperature to 1100° C. over 15 minutes, maintained at 1150° C. for 20 minutes, and then cooled to room temperature over 15 minutes in $H_2$ gas (dew point: −50° C.). This process is considered as one cycle. The changes in weight of the test piece after 100 cycles were measured to evaluate durability.

EXAMPLES 1–2

A fiber-composite material in which a silicon carbide phase is formed along the surface of the yarn and an Si—SiC-based material is filled between the yarns was prepared by melting and impregnating Si into a C/C composite body material of a thickness of 100 mm.

The C/C composite was prepared by the following method.

By impregnating phenol resin to carbon fibers pulled and aligned in one direction, about ten thousand carbon long fibers of diameter 10 μm were tied in a bundle to obtain a fibrous bundle (yarn). The yarn was arranged as shown in FIG. 1 to obtain a prepreg sheet. Then, the prepreg sheet was processed at 180° C. and at 10 kg/cm$^2$ with a hot press to cure the phenol resin and was burned at 2000° C. in nitrogen to obtain a C/C composite. The obtained C/C composite had a density of 1.0 g/cm$^3$ and a porosity of 50%.

The C/C composite was then vertically placed in a carbon crucible filled with silicon powder of purity 99.8% and of mean particle size 1 mm. After that, the crucible was moved into a burning furnace. The C/C composite was processed to impregnate silicon into the composite and produce the fiber-composite material according to the present invention, under the following condition: the burning furnace temperature of 1300° C., the flow rate of argon gas as inert gas of 20 NL/minute, the furnace internal pressure of 1 hPa, the holding time of 4 hours and then the furnace temperature was raised to 1600° C. while the same furnace pressure was kept.

Figure 6:
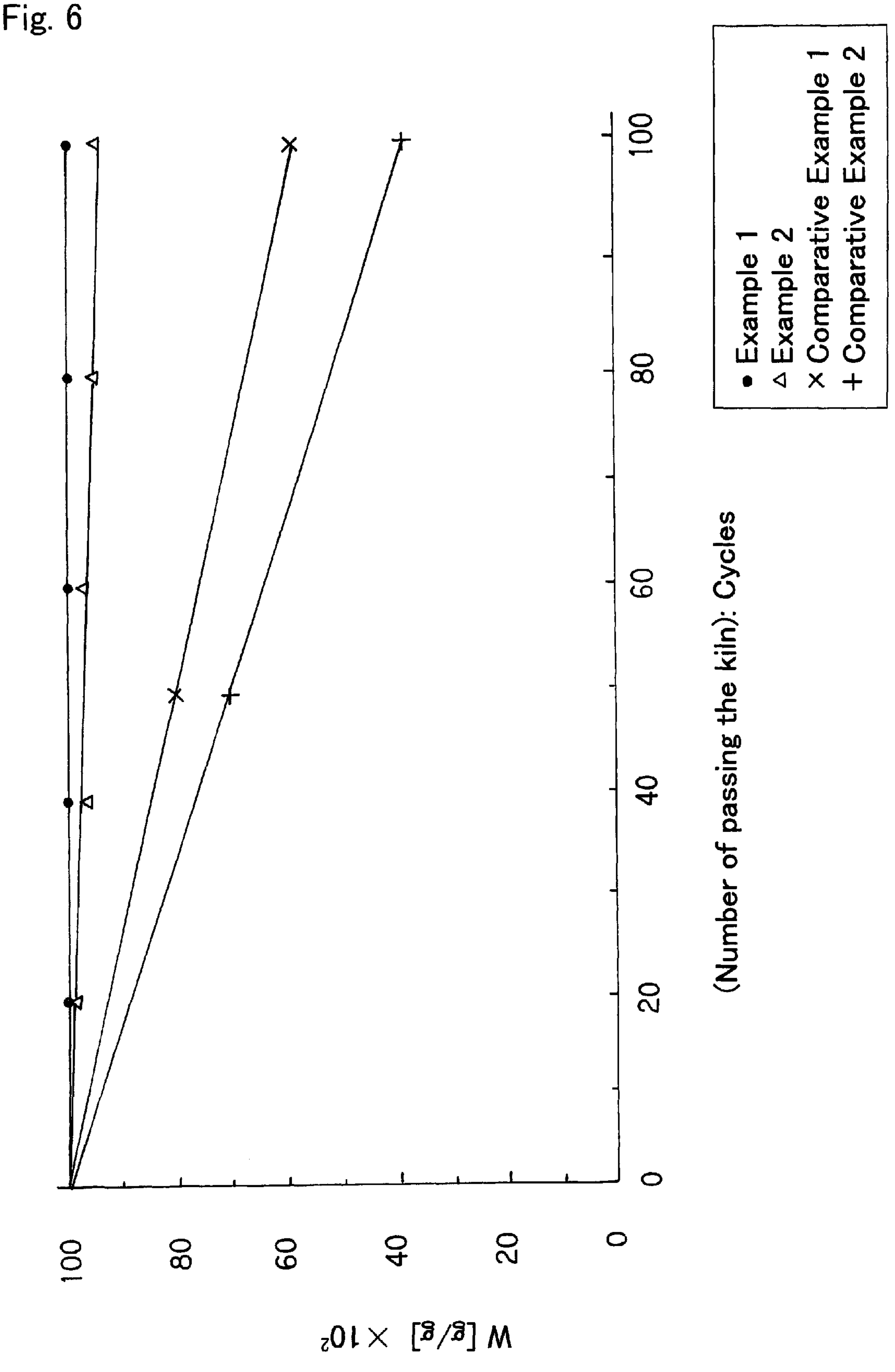
FIG. 6 is a graph showing the results of durability tests 1 and 2 of a kiln tool under atmospheric gas.

The measured results such as density, porosity, compression strength, dynamic coefficient of friction, working accuracy, and workability of the obtained fiber-composite material are shown in Table 1, and the results of the durability test 1 (Example 1) and durability test 2 (Example 2) in atmospheric gas are shown in FIG. 6.

Comparative Examples 1–2

For comparison, test pieces composed of a carbon material were subjected to the durability test 1 (Comparative Example 1) and durability test 2 (Comparative Example 2) in atmospheric gas, and the results are shown in FIG. 6. Measurement of working accuracy showed that Ra was 15.0 μm.

Workability was evaluated for the fiber-composite material mentioned above and an Si—SiC-based material (NEWSIC manufactured by NGK Insulators, Ltd.) under the experimental conditions shown in Table 2 and the results shown in FIG. 7 were obtained.

TABLE 1

| Density of body material (g/cm$^3$) | Porosity of body material 1 (%) | Density (g/cm$^3$) | Porosity (%) | Compression strength Mpa | Dynamic coefficient of friction ($\mu$) | Working accuracy (Ra) ($\mu$m) |
|---|---|---|---|---|---|---|
| 1.6 | 20 | 2.05 | 1–2 | 190 | 0.21 | 1.4 |

TABLE 2

| | |
|---|---|
| Working conditions | Grinder: MSG-300HG (Mitsui Hi-tech)<br>Grinding fluid: N-COOL S-1 (National Trade)<br>Grinding method: Wet plane transverse grinding<br>Wheel peripheral speed: 30 m/s (25 m/s, 27 m/s)<br>Table feed rate: 20 m/min (10 m/min, 12 m/min)<br>Lengthwise feed: 3 mm/pass (1.5 mm/pass, 2 mm/pass)<br>Unit feed: 10 $\mu$m (10 $\mu$m)<br>Total feed: 10 mm<br>Spark out: 0 time<br>Note: Values in parentheses are from documents |
| Wheel used | Type: SDC200N100BF50<br>Size: Φ300 × 10 mm |
| Dressing conditions | Dressing method: Rotary dresser method<br>Dressing grind stone: Cup-type WA#150<br>Wheel periphery speed: 16 m/s<br>Peripheral speed of dressing grind stone: 3.5 m/s<br>Unit feed: 10 $\mu$m/pass<br>Total feed: 0.5 mm |

Discussion

As apparent from FIG. 6, it was found that the fiber-composite material used in the kiln tool of the present invention exhibited a lower weight reduction rate as compared to the conventional carbon material, presented no incidence of cracking for 100 cycles both in durability tests 1 and 2, and was excellent in durability even in the presence of a minor amount of oxygen components (due to dew point from +10° C. to −50° C.).

It was also found that the working accuracy of the fiber-composite material used in the kiln tool of the present invention was expressed by Ra not higher than 3 $\mu$m, whereas that of the carbon material was expressed by Ra around 15.0 $\mu$m, the results indicating excellent working accuracy for the former.

As for workability, as shown in FIG. 7, the fiber-composite material used in the kiln tool of the present invention can be worked at a speed about 10 times faster than that for the Si—SiC based material and the amount of a grind stone abraded was reduced, the results indicating excellent workability.

As mentioned above, the kiln tool of the present invention can be suitably employed as a kiln tool with a complicated shape, such as a plurality of fine grooves, since it has good workability and working accuracy together with improved durability in high temperature and strong oxidation and corrosion environments.

What is claimed is:

1. A kiln tool comprising:

a fiber-composite material comprising a yarn aggregate in which yarn including at least a bundle of carbon fibers and a carbon component other than carbon fibers is three-dimensionally combined and integrally formed so as not to separate from each other, and a matrix made of Si—SiC-based material filled between adjacent yarns within the yarn aggregate.

2. The kiln tool with good workability according to claim 1, wherein working accuracy (Ra) is not more than 3 $\mu$m.

* * * * *